Feb. 13, 1951 T. S. JONES 2,541,072

AUTOMATIC RECORD CHANGER

Filed Jan. 3, 1942 5 Sheets-Sheet 1

INVENTOR
TOWNSEND S. JONES

BY John W. Haag.
ATTORNEY

INVENTOR
TOWNSEND S. JONES
BY John W. Hoag
ATTORNEY

AUTOMATIC RECORD CHANGER

Filed Jan. 3, 1942 5 Sheets-Sheet 3

INVENTOR
TOWNSEND S. JONES

BY John W. Haag
ATTORNEY

INVENTOR
TOWNSEND S. JONES
BY John W. Hoag
ATTORNEY

INVENTOR
TOWNSEND S. JONES
BY John W. Haag
ATTORNEY

Patented Feb. 13, 1951 2,541,072

UNITED STATES PATENT OFFICE 2,541,072

AUTOMATIC RECORD CHANGER

Townsend S. Jones, Elizabeth, N. J., assignor, by mesne assignments, to Farnsworth Research Corporation, a corporation of Indiana Application January 3, 1942, Serial No. 425,526

16 Claims. (Cl. 274—10)

This invention relates to record changers for phonographs and the like. More particularly it relates to such a device wherein a number of records may be initially loaded above the turntable and the upper surface of each record played successively without manual "changing of records," or manual operation of any kind except for pressing down on the tone arm to start the motor, the said records being thereafter dropped successively onto the turntable and the tone arm being lifted and swung clear of the turntable after one record is played, and returned and positioned at the beginning of the sound track of the next record. After all the records have been played the device will shut itself off automatically after returning the tone arm to rest position.

Heretofore record changers of the kind to which this invention is directed have been expensive to manufacture and frequently subject to repair due to the extremely close fit required between component parts of the mechanism by which the intricate operations of automatically changing records and operating and positioning the tone arm, have been effected. The tolerance specifications for the parts of such prior art devices have been so narrow that the whole device has been liable to be rendered inoperative by a slight error in the machining of one of the parts or due to one or more of the parts being slightly bent or otherwise injured in the factory or by the user. Thus, for example, the clearance between the phonograph turntable and the means which periodically move into engagement with the turntable to drive the record changing mechanism has been as little as five thousandths (.005) of an inch in many prior art devices. As a result if there is any eccentricity in the periphery it is likely to cause the wheel to contact the turntable intermittently during each rotation of the turnable during the time when a record is being played and when it should be out of contact with the turntable, thus tending recurrently and intermittently to actuate the record changing mechanism causing the rotation of the turntable to be slowed or the synchronism between the movement of the tone arm and the record change to be progressively destroyed, spoiling the operation of the device.

An object of this invention is to provide a simplified device which may be easily assembled, and which will be durable in use.

Another object of the invention is to provide operating mechanism without the extremely close fitting of parts and the extremely limited tolerance specifications characteristic of the prior art devices.

Another object of the invention is to provide a simplified mechanism the operation of which will not be affected by variable factors beyond the record-changer-manufacturer's control, such as variance in thickness and diameter of different records.

Other objects of the invention will be apparent from the following description of one embodiment of the invention and the appended claims. The invention will best be understood if the description is read in connection with the accompanying drawings, in which Fig. 1 is a side elevation, partly in section, of my record changing and tone arm positioning mechanism applied to a phonograph turntable and support base;

Figures 1, 2, 3, 4:
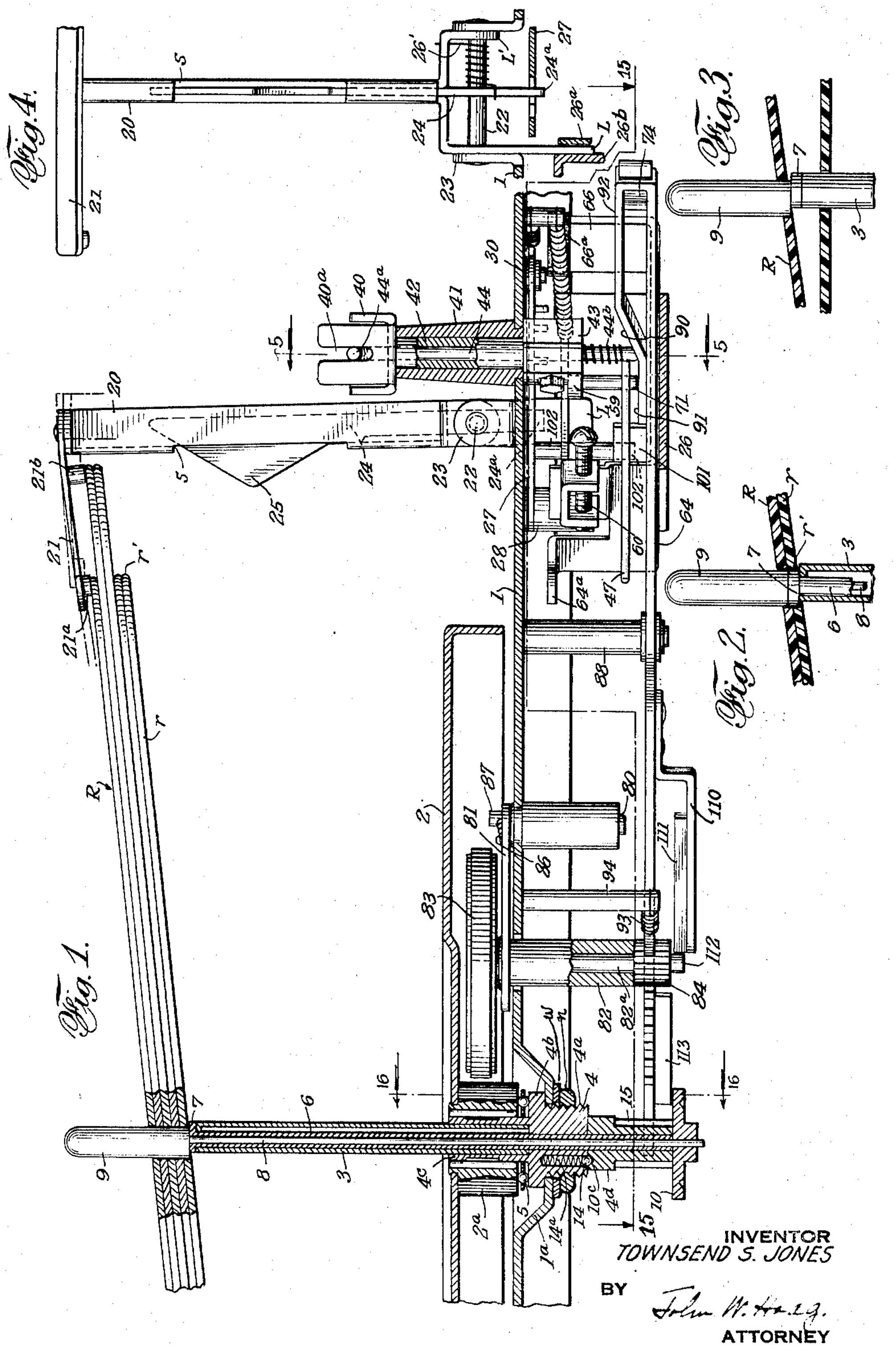
Fig. 2 is a detail view, partly in section, of the spindle record support showing two records centered on the offset spindle top with the spindle cam half way through its 360° rotation for threading the lower record over the main spindle to drop it onto the turntable.
Fig. 3 is a similar detail view showing the cam rotated through a complete cycle of 360° from the position shown in Fig. 1 with a record dropping down the main spindle.
Fig. 4 is a front view, partly cut away, of a composite record tilt top stop for limiting the tilt of records supported on the spindle and a tone arm indexing member for causing the tone arm to be selectively lowered to engage the initial playing grooves of records of various diameters, or to assume a rest position at the completion of the playing of a single record or a series of records.
Figures 5, 7, 12:
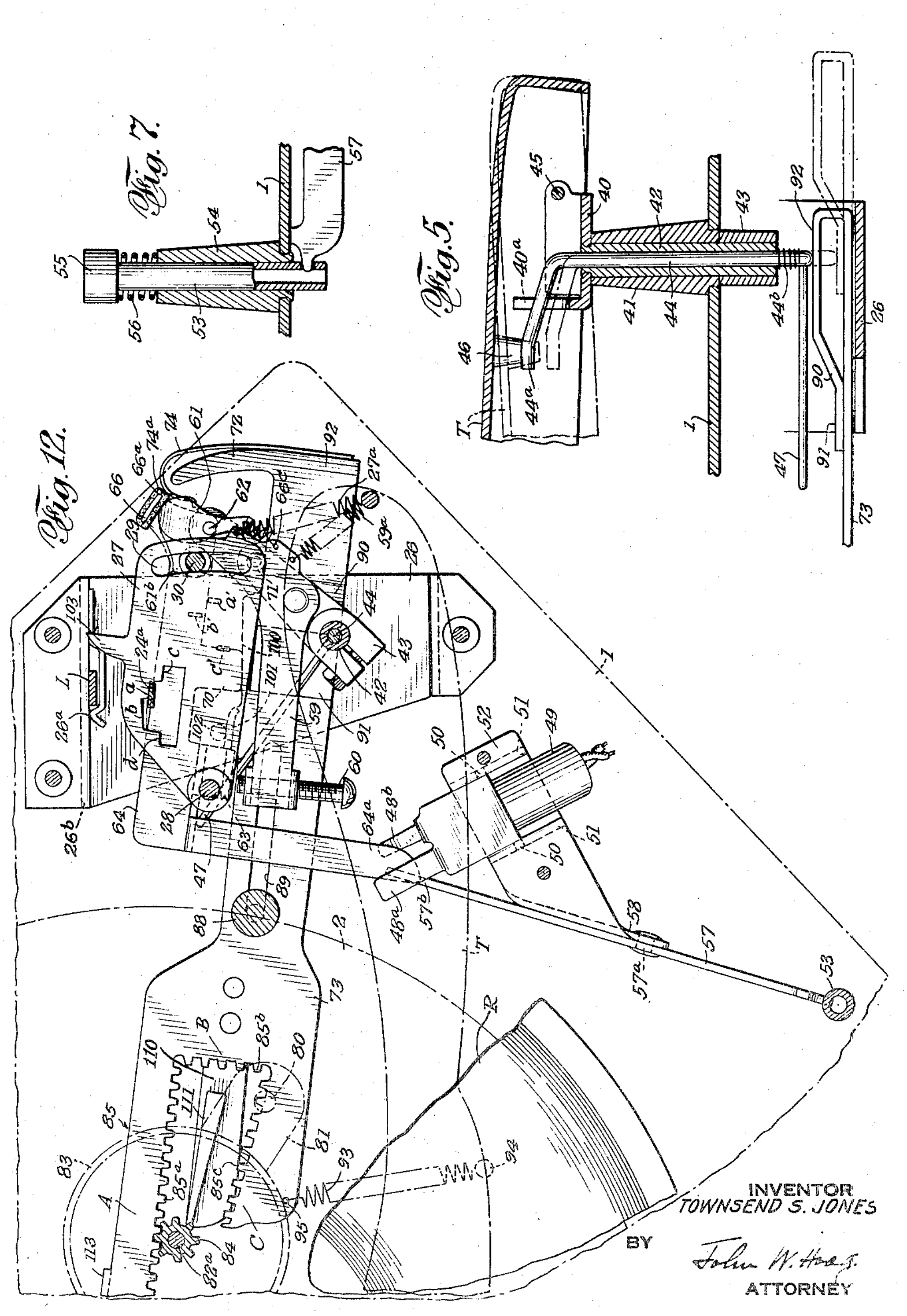
Fig. 5 is a detail transverse elevational view, partly in section, taken on line 5—5 of Fig. 1, of the tone arm assembly showing the tone arm raise pin resting on the operating lever in lowered position (in dotted lines) and in elevated position (in full lines)
Fig. 7 is a detail view, partly in section, of the start-reject button, plunger and lever assembly.
Fig. 12 is a plan view having parts broken away and showing the record changing and tone arm positioning mechanism in its position at the start of a change cycle.
Figures 11, 15:
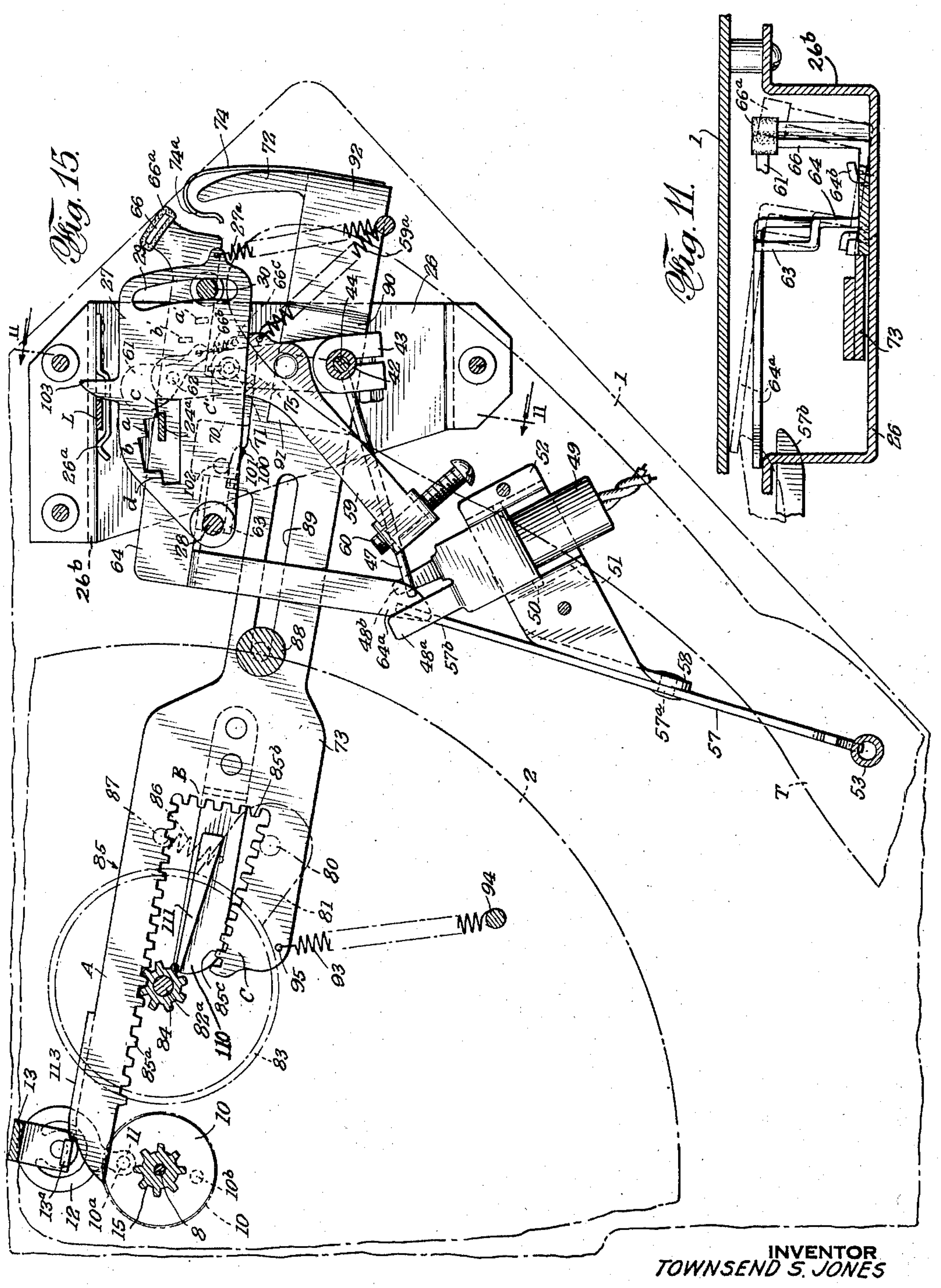
Fig. 11 is a detail view, partly in cross section and omitting certain parts, taken approximately on the line 11—11 of Fig. 15, showing the tilt lever and its start-reject abutment finger in its tilted (dotted lines) and untilted (full lines) position.
Figures 13, 16:
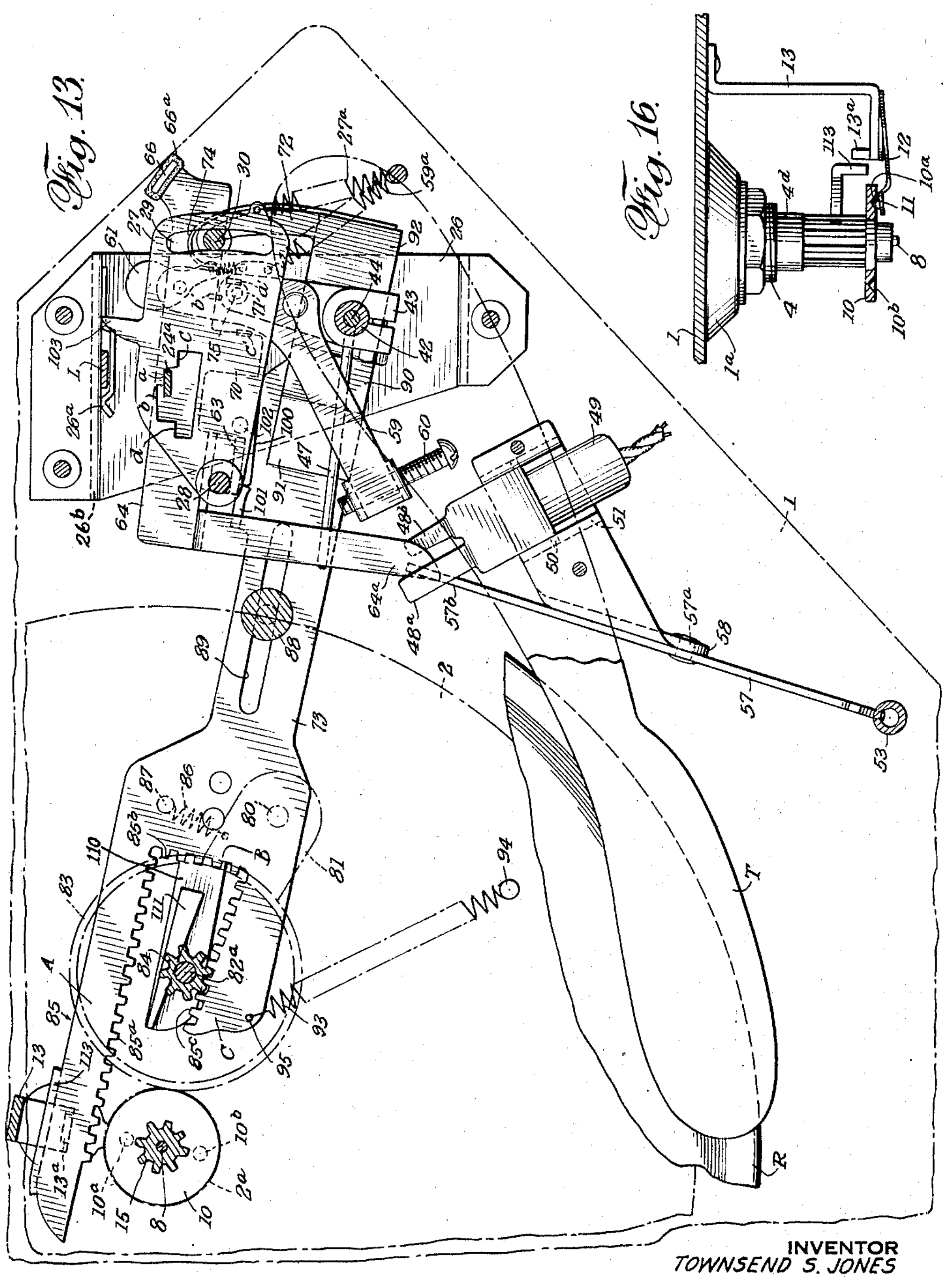
Fig. 13 is a plan view having parts broken away and showing the record changing and tone arm positioning mechanism near the end of its change cycle at the start of playing a record of minimum standard diameter (i. e. 10 inches)

Fig. 15 is a plan view of the device, partly in section on line 15—15, Fig. 1, showing record changing and tone arm positioning mechanism at the completion of a cycle (while a record is being played); and Fig. 16 is a detail view, partly in section, taken on the line 16—16 of Fig. 1, showing the lower end of the spindle assembly with the pinion by which the spindle cam is rotated in engagement with the operating lever.

Referring first to Fig. 1, the numeral 1 indicates a base plate above which the turntable 2 is rotatably supported on the hub of spindle 3 which projects upwardly through a central aperture in the turntable and serves to center the records. The upper end of spindle 3 forms a support for engaging records adjacent the centering apertures whereby the records may be offset relatively to the spindle. This is the initial position of the records when they are loaded onto the spindle assembly for automatic operation of a phonograph equipped with my mechanism, as will be described.

The spindle 3 is rigidly supported in upright position on the base plate 1. As illustrated herein the spindle is provided with a base portion 4 of increased diameter having an externally threaded portion 4*a* extending through base plate 1, and held in place by the nut *n* and lock washer *w*. Outwardly flanged portion 4*b* rests on the upper surface of base plate 1, which may be bent downwardly as indicated at 1*a* to provide a depression around the spindle thus enabling the turntable to be supported close above the base plate 1. As illustrated herein the turntable 2 has a downwardly extending flange or lip 2*a* around its center opening for engaging ball bearings 5 which rest upon spindle flange 4*b*. The spindle base portion 4 is provided with a shoulder 4*c* extending upwardly through the central opening in the turntable 2 to form a bearing about which the turntable rotates.

Extending upwardly through spindle 3 and rotatably supported therein on an axis eccentric to the axis of the spindle is a sleeve 6. At the upper end of this sleeve is a laterally projecting cam 7 the thickness of which is slightly less than that of a standard record. The diameter of the cam 7 is the same as that of the spindle. By rotating sleeve 6 on its eccentric axis, the cam 7 is moved from a position of alignment with spindle 3 to a position in which it partially uncovers the top of spindle 3 as illustrated in Fig. 1.

Projecting upwardly through sleeve 6 is a rod 8 having an enlarged portion or spindle top 9 equal in diameter to spindle 3 and cam 7. It will be readily understood since member 9 is mounted on rod 8, which is concentric with hollow sleeve 6, that the member 9, like cam 7, may be moved from a position in which it is in alignment with spindle 3 into an offset position which will be greatest when it has rotated on its axis rod 8, 180° away from its position of alignment with spindle 3.

When it is desired to place records on the turntable 2 by hand, which is referred to herein as "manual operation," spindle top 9 and cam 7 may be rotated into alignment with spindle 3. For so-called "automatic operation" of my device the spindle top 9 may be rotated to an offset position in relation to spindle 3. Accordingly an indexing disk 10 (see Figs. 1 and 16) is provided at the lower end of shaft 8 having two indented seats 10*a* and 10*b* in its lower surface. The seats are spaced 180° apart to engage the spring catch 11 formed at the end of spring arm 12, which may be secured to a bracket member 13 depending from base plate 1. When spring catch 11 is seated in seat 10*b* spindle top 9 will be in alignment with spindle 3, and when spring catch 11 is seated in seat 10*a* spindle top 9 will be in its extreme offset position relative to spindle 3 as illustrated in Fig. 1.

Similarly, means is provided for indexing cam 7 in its position of alignment with spindle 3, which is its position at the start and at the end of its rotation of exactly 360°. As illustrated this indexing means is the spring pressed ball catch 14, supported in an upwardly extending bore 14*a* in spindle base 4. For engaging catch 14, seat 10*c* is provided in the top surface of sleeve 4*d* fixed to cam sleeve 6. The pinion 15 is keyed to sleeve 6 whereby cam 7 may be rotated as will be described.

It will be understood that the indexing means for spindle top 9 and cam 7 are easily unseated and serve not only to prevent either from being accidentally rotated but also as an aid in positioning the spindle top when changing from automatic operation to manual operation and vice versa.

Once in each cycle of operation of the change mechanism pinion 15 is engaged by a rack, as will be described, and rotated through exactly 360° to cause the cam 7 to rotate from the position shown in Fig. 1 to the 180° offset position shown in Fig. 2, causing the lowermost record *r* of a number of records R, threaded on spindle top 9 and initially resting on cam 7, to drop from the position illustrated in Fig. 1 to the position illustrated in Fig. 2. Record *r* becomes threaded over and centered on cam 7 and is supported upon the uncovered upper end of spindle 3. Cam 7 continues to rotate from its 180° offset position, shown in Fig. 2, to its position of alignment with spindle 3, as shown in Fig. 3, during which time it will engage the inside edge *r'* of the lowest record, *r*, and move the record laterally until its centering aperture is in alignment with spindle 3, when the record will fall to the turntable to playing position.

As illustrated in Fig. 1, records to be played automatically one after the other are threaded over spindle top 9 when it is turned to the offset position relatively to spindle 3, whereby they may be supported initially in more or less tilted position on the top of cam 7 which is normally in its position of alignment with spindle 3.

Tilting of the records occurs due to the fact that they are supported slightly off center causing them to tilt upwardly in the direction of the support relative to the record center.

In order to partially level the records centered on spindle top 9 and to limit the degree of tilt even when only one record remains on the spindle, a record tilt stop is provided.

*Tilt stop*

As illustrated herein the tilt stop comprises a U-shaped or channel upright member 20 extending upwardly from base-plate 1 and provided at its top with an arm 21 extending over the records centered on spindle top 9. Downwardly projecting contacts 21*a* and 21*b* are spaced from the inward edge of arm 21 so that they may engage the outer edge of records of different sizes. Upright member 20 is divided at its lower end into two legs L and L′ which are pivotally secured on cross pin 22 extending between the upwardly extending ears such as 23 formed by cutting and bending up a portion of base-plate 1.

*Indexing means for tone arm descent*

On the inner or cross portion of upright 20 a vertically extending slot *s* is provided. Rotatably mounted on the cross pin 22 and extending upwardly between the spaced sides of member 20 is a member 24 having at its upper end an inwardly projecting triangular portion 25 constituting a cam extending through slot *s*. Cam portion 25 normally projects under the records on the spindle sufficiently to be engaged by a 12 inch record as it falls but not by a 10 inch record. A light spring 26′ is provided around the rod 22 on one side of member 24 and is secured at one end to member 20 and at its other end to member 24 thereby urging member 24 into substantial alignment with member 20.

The lower end 24*a* of member 24 extends below pivot rod 22 through an aperture in the base-plate 1, and, depending upon its angular position relative to base-plate 1, may contact any one of several shoulders, *a*, *b*, *c*, and *d*, formed by cutting out a central portion of the tone arm position selector plate 27, thereby indexing selector plate 27.

Plate 27 is rotatably supported at one end on pivot 28 depending from the under side of base-plate 1. At its other end, there is provided a curved slot 29 which engages and travels on the guide 30 depending from the under side of base member 1. Selector plate 27 has projecting downwardly from its lower surface the stops *a*′, *b*′, and *c*′, which when properly positioned by the engagement of shoulder *a*, *b*, or *c* respectively with the lower end 24*a* of indexing arm 24, limits the inward travel of the raised tone arm T thus placing it in the proper position to be lowered for the particular size of record to be played, or causing the tone arm to be lowered in its position of rest when the last record has been played, as will be more fully explained hereinafter.

As illustrated herein shoulder *a* and stop *a*′ are devised to limit inward movement of the tone arm and control its point of descent for playing a 10 inch record; shoulder *b* and stop *b*′, and shoulder *c* and stop *c*′ are devised to serve similarly for a 12 inch record, and for rest position of the tone arm. Shoulder *d* cooperates with stop *c*′ in lowering the tone arm to rest position when members 20 and 24 are rotated to extreme outward position where leg L is engaged by spring catch 26*a*.

Let L extends below base-plate 1 through the opening provided by the upturning of the ears 23 and, when the tilt stop assembly is rotated outwardly, as for example when placing records on the turntable manually, as will be explained, it will be held in that position by the engagement of leg L with spring catch 26*a* until it is disengaged and rotated inwardly for automatic operation. Catch 26*a* is mounted on the depending flange 26*b* of bracket 26 depending from the bottom of base member 1.

*Tone arm assembly*

The tone arm T and its internally contained sound reproducing cartridge form no part of the present invention per se and may be of standard construction. The tone arm T is pivotally mounted on a bracket 40 rigidly mounted on a hollow pillar 41 extending upwardly from base-plate 1. Extending upwardly through the pillar 41 and through an aperture in the base member 1 is a bushing 42, and extending up through bushing 42 is "raise" pin 44 which is bent forwardly at its upper end and rests in a vertical slot 40*a* provided in the front end of the bracket 40 on which the tone arm is pivoted by pivot 45. The forward end 44*a* of pin 44 abuts against the under surface of a lug 46 depending from the under side of the tone arm T, whereby when pin 44 is raised vertically the tone arm is tilted upwardly around its pivot 45, and when pin 44 is lowered the tone arm is similarly lowered.

Figure 8:
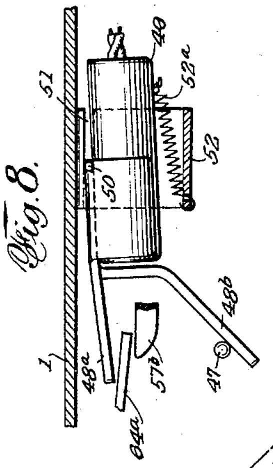
Fig. 8 is a detail view, partly in section, showing the mercury switch in its "off" position.
Figure 9:
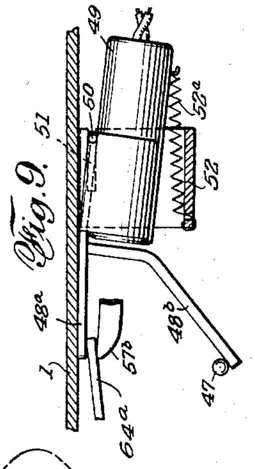
Fig. 9 is a similar view showing the switch in its rear, or starting, "on" position.
Figure 10:
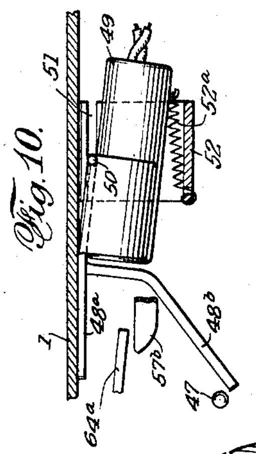
Fig. 10 is a view similar to Figs. 8 and 9 showing the mercury switch in its forward "on" position, which it assumes shortly after initially starting the mechanism.
Figures 6, 14:
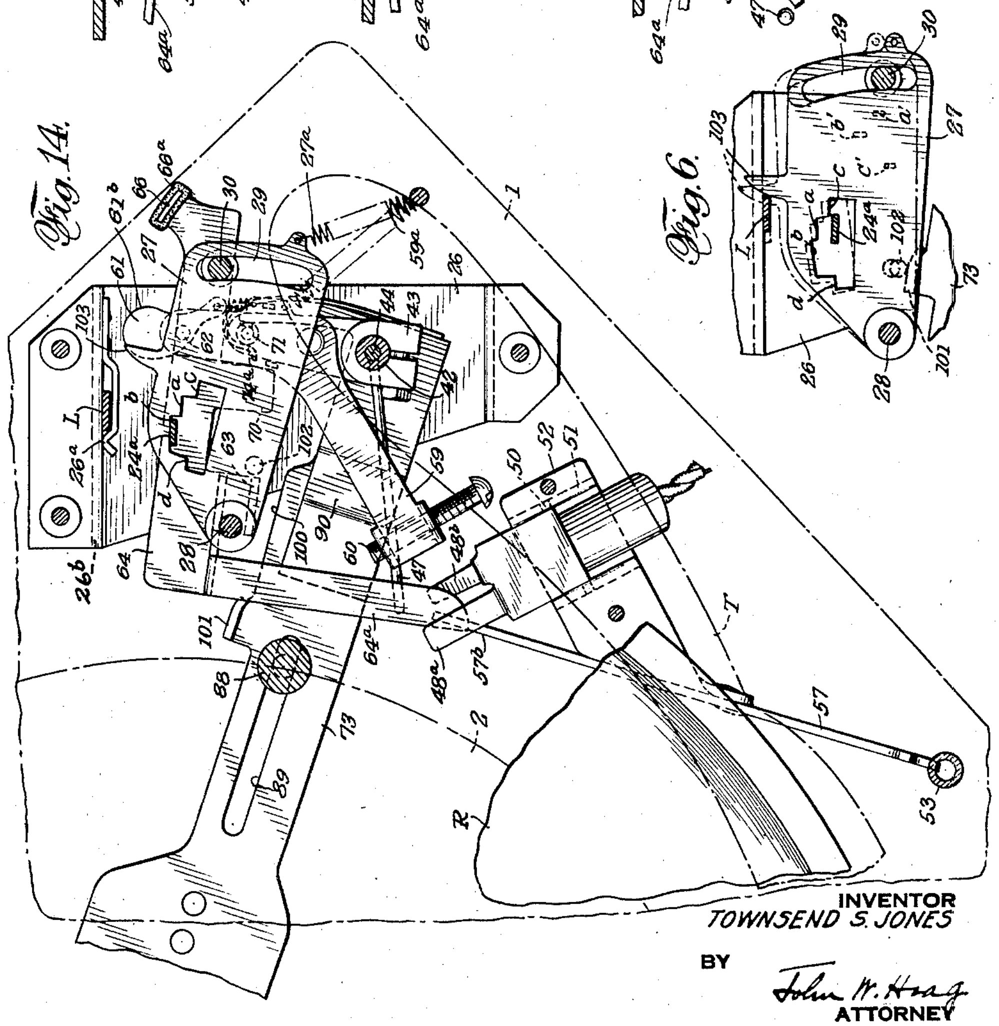
Fig. 6 is a detail view showing the tone arm descent position selector plate assembly.
Fig. 14 is a plan view having parts broken away and similar to Fig. 13 showing the position of the parts at the beginning of playing a 12 inch record.

At its lower end the raise pin 44 has a laterally projecting sweep arm 47, which, when the tone arm is at or adjacent its rest position on start-reject button 55, is brought into operative contact with a switch member, such, for example, as the mercury switch 49 illustrated in Figs. 8, 9, and 10, serving either to turn "off" the switch or to cooperate with the start-reject lever 57 in turning it on. The switch structure is not described in detail since it per se forms no part of the present invention.

Around pin 44, between arm 47 and the end of bushing 42, there is provided a spring 44*b* which tends to return pin 44 to its lowered position.

*Control switch*

The switch member 49, as illustrated herein, has two inwardly projecting fingers, 48*a* projecting substantially horizontally from the top of the switch member, and 48*b* which is inclined downwardly; and it is provided with a pair of laterally extending pins 50 which are slideably mounted in a slideway 51 provided in the vertical side walls of a bracket 52 depending from the base 1. It will thus be understood that the switch may be operatively supported in its slideway in a plurality of positions. The switch is normally held in "on" position by a spring 52*a* extending between the inner end of the bracket 52 and the outer end of the switch member 49.

When the tone arm is at rest the sweep arm 47 abuts against the inclined switch finger 48*b* tilting the switch member 49 and turning it to "off" position. Upon starting the device, the switch is rotated upwardly on its pivots to "on" position by being moved rearwardly in its slideway, thus freeing it from the tilting action of sweep arm 47. The rearward movement of the switch is accomplished by raising switch finger 48a thus causing the finger 48b to slide upwardly along sweep arm 47. Switch finger 48a is raised by elevating the front end 57b of lever 57 which is actuated by depressing the start-reject plunger 53.

*Start and "reject" means*

Start-reject plunger 53 extends upwardly through base 1 and the vertically extending pillar or sleeve 54. On top of plunger 53 the button 55 is provided. Plunger 53 is normally held in raised position by a spring 56 interposed between button 55 and the top of pillar 54. The lower end of plunger 53 is connected to one end of lever 57 which is pivoted at 57a to a bracket 58 depending from base 1. When button 55 is depressed the lever 57 is rotated on its pivot 57a causing its forward end 57b to rise and simultaneously elevate trip lever finger 64a, to be described, and the mercury switch finger 48a, causing switch member 49, due to the abutment of inclined finger 48b against sweep arm 47, to slide rearwardly in its slot 51 and assume an "on" position. When tone arm raise pin 44 rises, it moves sweep arm 47 out of contact with finger 48b of the switch. Spring 52a causes the switch member to slide inwardly in its slideway 51 but the switch member 49 remains in "on" position and continues in "on" position while one or more records are being played and until it is moved to "off" position by contact of sweep arm 47 on finger 48b when the tone arm is returned to rest position.

Positioned above the forward end of lever 57 is the forward end of the finger 64a of the trip lever 64. Thus, when the start-reject button 55 is depressed, the forward end of lever 57 lifts trip lever finger 64a to trip the lever 64. The trip lever is actuated by the raising of finger 64a in initially starting the mechanism or "rejecting" a record, in each of which cases the start-reject button is depressed. The trip lever is tripped at the conclusion of playing a record by action against its lip 63 or lip 66 as will be described.

The lower end of raise pin 44 is adapted to move up and down an inclined surface 90 on an operating lever 73, to be described, during each record change cycle, thereby tilting the tone arm T upwardly after a record has been played and thereafter lowering it to starting position for the playing of the next record.

*Sweep lever and trip lever*

Clamped on an extension of the tone arm rotatable bushing 42, which projects below base member 1, is a split member 43 to which is fixed sweep lever 59 which rotates with the tone arm assembly. Affixed to one end of the sweep lever 59 is a tripping member 60 which is illustrated as an adjustable fixed-stop screw. Mounted on pivot 62 at the other end of the sweep lever 59 is a friction contact cam member 61 which serves as another tripping member.

The tripping member 60 is adapted to abut against the upwardly projecting lip 63 on trip lever 64 which is attached by the hinges 64b to the upper surface of the support bracket 26 depending from base 1. Tripping member 60 is operative when the tone arm has reached a predetermined fixed point of inward travel.

The tripping member 61 is adapted to abut against an upwardly projecting lip 66 on trip lever 64, and is operative when the tone arm tracks an eccentric tripping groove usually provided at the end of the sound track of modern records. The tripping member 61 has a curved contact surface 61b and the cooperating trip lever lip 66 is preferably similarly curved and may be provided with a resilient friction covering 66a, such for example, as rubber. The curved contact surface 61b is arranged in such relation to the pivot 62 that inward movement of the tone arm will allow member 61 to pivot against its own return spring 66b, which is attached between the rearward end of member 61 and the pin 66c on the trip lever, and bear lightly against lip 66 on trip lever 64. Any outward motion of tone arm T in the tripping groove of the record will cause a double-expanding-lever action between the contact edge 61b of member 61 and the lip 66, working against pivot 62 as one member and sweep lever 59 as the other member, thereby causing trip lever 64 to be tripped. Tripping of the trip lever removes lip 66 from any possible contact with tripping member 61.

The finger 64a, projecting from the trip lever 64 to a point above the forward end 57b of lever 57, constitutes a third tripping member and is raised by depressing the start-reject button 55 as already described.

Also carried on sweep lever 59 is a downwardly projecting pin 71 positioned in front of, and projecting into the path of movement of, the laterally projecting finger 72 carried at the rear end of operating lever 73. Upon inward movement of the operating lever the pin 71 is engaged by finger 72, causing the tone arm sweep lever 59 to be rotated in a direction to return the tone arm T to a position over its rest position i. e. over start-reject button 55 or, if the tone arm is already in its rest position finger 72 will merely contact pin 71, at that position.

Upon outward movement of operating lever 73, after the operating lever has been rotated on its pivot as will be described, the spring arm 74 fixed at the end of operating lever 73, and having at its free end an inwardly curved hook portion 74a extending around the free end of finger 72, will yieldingly engage pin 71 and rotate sweep lever 59 to move the tone arm T inward until spring member 74 disengages pin 71 when pin 75 projecting upwardly from the sweep lever 59 is abutted against one of stops a', b', or c' on selector plate 27. When this occurs the operating lever 73 will continue its motion and spring arm 74 will slip off pin 71, thus stopping movement of the sweep lever 59 and leaving it indexed to allow tone arm T to be lowered in correct position to engage the initial playing groove of a record of the size indicated by the particular stop a' or b' interposed in the path of pin 75, or to be lowered in its rest position of the rest stop c' is interposed in the path of pin 75.

*Driving means for change mechanism*

Pivoted at 80 on top of base-plate 1 is a bracket 81 having at its free end the sleeve 82 disposed in a slot in base 1 which is shaped to permit a substantial degree of angular movement of the sleeve. Rotatably supported in sleeve 82 is a vertical shaft 82a having at its upper end above the support base-plate a rubber tired wheel 83 and at its lower end below the base-plate a pinion 84. Wheel 83 is thus movable with bracket 81 into and out of contact with the inner surface of flange 2a of the turntable 2 but it is held well out of engagement with the turntable hub flange 2a, when the record change mechanism is at rest, due to the action of spring 86 attached between bracket 81 and post 87 on base-plate 1. Wheel 83 is moved into frictional engagement with turntable hub flange 2*a* at the beginning of each change cycle by the swinging movement of operating lever 73 under the action of spring 93 extending between the operating lever and the post 94 depending from base 1. Wheel 83 is then positively driven from turntable hub 2*a*, and serves to drive pinion 84 to transmit reciprocal and rotative movement to the operating lever 73 by engagement with the U-shaped rack on the inner end of the operating lever.

*The operating lever*

The operating lever 73 is supported on stud 88 which is slideably engaged in longitudinal slot 89 in the central portion of operating lever 73.

The outer portion of operating lever 73 rests upon the upper surface of bracket member 26 and is slideably movable back and forth thereon. On the upper surface of operating lever 73, just outwardly from slot 89, is an inclined surface 90 leading from the lower horizontal surface 91 to an upper horizontal surface 92. The lower end of raise pin 44 rests on the upper surface of operating lever 73 and is raised and lowered to raise and lower the tone arm T as the inclined surface 90 reciprocates beneath it.

At the edge of the central portion of the operating lever 73 is a flange 100 which abuts against the laterally projecting tongue 70 of trip lever 64 until the trip lever is tripped at which time the operating lever is rotated in a counterclockwise direction due to the action of spring 93. Lever 73 then moves under tongue 70 of the trip lever, holding the trip lever in tilted or tripped position and operatively engaging rack 85 with pinion 84 by swinging bracket 81 causing rubber tired wheel 83 to engage the turntable hub 2*a* and starting the change cycle.

Also on the edge of operating lever 73 is the lip 101 which, when the operating lever is rotated in a counterclockwise direction, contacts pin 102 depending from selector plate 27 to rotate selector plate 27 on its pivot 28 and cause finger 103, which protrudes laterally from the edge of the selector plate, to contact the lower end 24*a* of the indexing member 24, thus causing the indexing member 24 to assume a vertical position if it is not already in a vertical position. With the indexing member 24 in vertical position the selector plate will interpose stop *a'* (for 10 inch records) in the path of upwardly projecting pin 75 on tone arm sweep lever 59. However, if the cam projection 25 of member 24 is contacted and moved outwardly by a record of larger diameter, the corresponding stop *b'* on the selector plate 27 will be interposed in the path of pin 75 when there is no record on the spindle, the lower end 24*a* of the indexing member 24 has been freed from finger 103 due to the rotation of selector plate 27 in a clockwise direction by spring 27*a* when the selector plate pin 102 is cleared from downwardly projecting operating lever lip 101 due to the inward movement of the lever. Member 24 will move forwardly causing the rest stop *c'* to be interposed in the path of pin 75 and the tone arm T to be lowered to rest position when it reaches a position above the start-reject button 55.

The inner end of operating lever 73 is bifurcated forming two laterally spaced arms A and C joined by cross head B the inner edge of which is perpendicular to the inner edge of arm A. The inner edge of arm C is somewhat inclined from the head B toward arm A, which is substantially longer than arm C. Extending the full length of the inner edge of arm C, across the inner edge of head B, and down the greater part of the inner edge of arm A is a rack indicated generally as 85, the portion on arm A being identified herein for convenience as 85*a*, the transverse portion along the edge of head B being identified as 85*b*, and the portion along the inner edge of arm C being identified as 85*c*.

Supported on the under surface of head B and projecting inwardly intermediate arms A and C is a bracket 110 on which is carried a wedge-shaped guide 111 the edges of which are substantially parallel to the corresponding rack portions 85*a*, 85*b*, and 85*c*. Guide 111 serves to keep racks 85*b* and 85*c* positively engaged with pinion 84 during their travel over pinion 84.

Spring 93, attached between post 94 depending from the base 1 and arm C at 95, tends to rotate operating lever 73 on its pivot 88 so that rack portion 85*a* will abut against pinion 84. In Fig. 15 is shown the position of rack 85*a* relative to pinion 84 when the change mechanism is at rest just prior to the beginning of a record change cycle. The engagement of pinion 84 and rack 85*a* causes the operating lever to move inwardly until transverse rack portion 85*b* comes into contact with and travels across pinion 84. The operating lever 73 will rotate in clockwise direction around its pivot 88 until rack 85*c* comes in contact with pinion 84 whereupon the operating lever will be moved outwardly until pinion 84 runs off rack portion 85*c*. Lever 73 with its bracket 110 then moves out of contact with the turntable hub thus ending a change cycle. When rack 85*c* runs off pinion 84 the latter due to spring 86 tends to move into engagement again with rack 85*a*. However, lever 73 is stopped by trip lever tongue 70 in a position to allow the wheel 83 to be pulled entirely clear of turntable hub 2*a*. When the trip lever is tripped, initiating a new cycle and permitting further counterclockwise rotation of operating lever 73 by its spring 93, the rotary movement of rack 85*a* against pinion 84 will impart a substantial swinging action to bracket 81, causing rubber tired wheel 83 to re-engage and be driven by the flange 2*a* of the turntable, and thus again start the inward travel of operating lever 73.

As operating lever 73 moves inwardly, the inner end of rack 85*a* will engage pinion 15, which is mounted on the sleeve 6 carrying spindle cam 7. The length of the rack 85*a* is so devised that cam 7 will be rotated exactly 360° before pinion 84 contacts rack portion 85*b*. As the operation continues rack portion 85*a* will be rotated out of engagement with pinion 15 to stop rotation of cam 7.

Spring 93 serves to maintain positive contact between pinion 84 and rack portion 85*a*. It will be seen that guide member 111 will serve to maintain positive engagement between the pinion 84 and rack portions 85*b* and 85*c* since during this movement the lower end 112 of shaft 82*a*, on which pinion 84 is mounted, engages the respective corresponding edges of the guide member.

Similarly guide 13*a* on bracket 13 abuts against the depending flange 113 at the forward end of operating lever arm A, holding rack 85*a* in positive engagement with pinion 15 on spindle cam sleeve 6 for 360° rotation of the spindle cam 7. Operating lever arm A is then rotated out of contact with pinion 15 and depending flange 113 during the outward movement of the operating lever 73 and returns on the outer side of guide 13a from pinion 15. Guide 13a is an effective guard against the inadvertent engagement of pinion 15 and rack 85.

*Summary of operation*

For automatically playing a number of records the first operation is to move the combined record tilt stop member 20 and the tone arm descent positioning index finger 24 away from the spindle 3 as far as possible to facilitate loading of records thereon. The spindle top portion 9 is rotated to its offset position relative to spindle 3 thus exposing top of cam 7 which is concentric with spindle 3. In this position any desired number of records may be threaded over offset spindle top 9 and supported above the turntable on spindle 3 and cam 7, the number being limited only by the length of spindle top 9.

Since the tone arm normally rests on start-reject button 55, the machine may be started by simply pressing down on tone arm T thus depressing start-reject plunger 53 which moves the switch 49 to "on" position and trips the automatic mechanism by pivoting start-reject lever arm 57 causing its free end to contact and raise trip lever extension finger 64a, thereby tilting trip lever 64 on its hinges 64b. Tilting of trip lever 64 raises the trip lever tongue 70 permitting operating lever 73 to be rotated by its spring in counterclockwise direction under the tilted edge of the trip lever. Lever 73 causes driving wheel 83 to make operative contact with turntable hub 2a and unseats the tone arm descent positioning plate 27 whereby it is returned by its spring 27a to neutral position for the start of a new cycle.

The edge 100 of the operating lever remains under trip lever tongue 70, holding the trip lever 64 in tilted or tripped position for a sufficient length of time to keep the switch 49 "on" in its rearward position until movement inward of operating lever 73 and its surface 90 lifts tone arm raise pin 44 and sweep finger 47 from contact with inclined arm 47b of the switch 49. Switch 49 will then slide forward in its slideway 51 due to the action of its spring 52a, and will remain in "on" position during successive cycles until the tone arm T is lowered to rest position on start-reject button 55. When the tone arm is lowered onto the start-reject button, the tone arm raise pin sweep finger 47 will contact and press down on inclined finger 48b thus tilting the switch to "off" position against the action of its spring 52a.

After the machine has been started manually it will be understood that the device will continue to operate through successive cycles, as long as there are records to be transferred from the record support to the turntable. Each new cycle is initiated by the tripping of the trip lever due to contact by adjustable fixed stop 60 or by friction contact cam 61.

When the change mechanism is at rest, drive wheel 83 is out of contact with the hub 2a of the turntable due to the action of spring 81a on pivoted bracket 81. Operating lever spring 93 is substantially stronger than drive wheel spring 86 and works in opposite direction so that when the operating lever is allowed to rotate by tripping lever 64, spring 93 will cause bracket 81 to swing on its pivot 80, moving drive wheel 83 into frictional engagement with the rotating hub of the turntable, thus causing rotation of rubber drive wheel 83 and, through engagement of pinion 84 with rack 85a, causing operating lever 73 to move inwardly toward the spindle. While the operating lever has been stopped from rotating by abutment against trip lever tongue 70 its lip 101 has been in contact with pin 102 on the positioning plate holding the positioning plate in its rest or neutral position so that tone arm T has been free to move inwardly across the record and out again clear of the turntable, without striking any of the tone arm positioning stops a', b', or c'.

Thus when operating lever 73 is freed from trip lever tongue 70 by the tilting of trip lever 64, and rotates the operating lever 73 also rotates in a counterclockwise direction the tone arm descent position selecting plate 27 which in turn contacts the lower end 24a of indexing arm 24 causing the record tilt-stop and indexing arm assembly to be raised to a vertical position, if it is not already in vertical position. In this position the tilt-stop and indexing arm assembly is adjusted for a 10 inch record and position selecting plate 27 is presenting stop a' in the path of inward travel of tone arm sweep lever.

If the next record to be dropped onto the turntable is a 12 inch record, it will, while falling onto the turntable, contact indexing finger cam projection 25 which will move indexing finger 24 thus indexing the positioning plate 27 to interpose the 12 inch stop b' in the inward path of pin 75 on the tone arm sweep lever, thus stopping inward movement of the tone arm and causing it to descend in position to contact the initial playing groove of a 12 inch record.

When the last record of a group loaded on the spindle has fallen onto the turntable, the tilt control arm 20, and its indexing arm 24, 24a, will fall forward thus indexing for rest position and engaging shoulder c of plate 27 for halting plate 27 in its rotative movement in position to present stop c' in the path of inward travel of the tone arm sweep lever.

As operating lever 73 moves toward spindle 3 it will interpose inclined surface 90 under raise-pin 44 thus raising pin 44 and tilting tone arm T upwardly on its pivot 45. At the same time it will carry lip 101 out of contact with pin 102 permitting position plate 27 to swivel in a clockwise direction under action of its spring 27a to the position permitted by selector plate indexing arm 24a. This will normally be the position for descent of tone arm T for a 10 inch record unless the indexing arm has been rotated to engage the "12 inch" shoulder due to the blow from a falling "12 inch" record. When the tilt stop falls inwardly after all records loaded on spindle top 9 have been played, or when tilt stop 20 is rotated outwardly to facilitate "manual" operation, the indexing arm is positioned to engage one of the two "rest' shoulders c and d.

During inward movement of the operating lever its finger 72 will engage pin 71 on tone arm sweep lever 59 thus entraining and rotating the tone arm clear of the turntable 2, to an elevated position over its rest position i. e. over the start-reject button 55. Also as operating lever 73 moves inwardly toward spindle 3 it will contact pinion 15, operating spindle cam 7 through exactly one complete revolution, the end of which movement preferably will coincide with the extreme inward (toward spindle) movement of the operating lever 73.

When rack 85a on operating lever finger A has moved inwardly its full length over pinion 84 the latter will engage the transverse rack 85b causing the operating lever 73 to rotate in a clockwise direction. Movement of rack 85b over pinion 84 will allow time for record R to drop to turntable 2 while tone arm T is in elevated position over start-reject button 55, and will swing the operating lever so that the spring finger 74 and hook portion 74a will engage at its resilient curved end the inward side of sweep lever pin 71. Outward movement of the operating lever begins when pinion 84 engages rack 85c on the arm C of the operating lever 73. During outward movement of the operating lever spring finger 74 remains in engagement with pin 71 causing the tone arm T to move inwardly from above its rest position until it is stopped by abutment of pin 75, on lever 59, against whichever one of the tone arm descent stops *a'*, *b'*, or *c'* on selector plate 27 has been interposed in its path. The rotative movement of selector plate 27 is limited by the indexing member 24a which acts as a stop against one of the shoulders *a*, *b*, or *c* in the cutout portion of selector plate 27. The shoulder which is effective is determined by the position of member 24a as explained hereinbefore. When this occurs resilient spring finger 74 will slip off pin 71 and tone arm T will stop although operating lever 73 will continue moving outwardly.

Further outward movement of operating lever 73 returns the inclined surface 90 of the operating lever under the tone arm lift pin 44 allowing it to descend, thus lowering the tone arm in the angular position determined by the particular selector plate stop interposed in its path.

As the operating lever continues to move outwardly rack 85c will run off pinion 84, freeing the pinion from guide bar 111 whereupon driving wheel 83 is rotated out of engagement with the turntable hub 2a by force of its spring 86. Operating lever 73 is now free to rotate under action of its spring 93 and is rotated back in a counterclockwise direction toward its starting position but is stopped before reaching the starting position by abutment of its edge portion 100 against the edge of trip lever abutment tongue 70. Drive wheel 83 and bracket 81, under action of spring 86, moves in a clockwise direction until pinion 84 comes in contact with rack 85a of the operating lever 73 which is now in such a position that the drive wheel 83 is entirely clear of rotating turntable hub 2a, thus ending a record-change cycle.

Toward the end of this cycle and as engagement ends between pinion 84 and rack portion 85c, the operating lever lip 101 begins to contact tone arm descent position selector plate pin 102, and the aforesaid rotation of operating lever 73 causes rotation of the plate 27 in a counterclockwise direction against its spring 27a, freeing indexing arm 24a from its engagement with a shoulder of the selector plate 27, and removing all stops *a'*, *b'*, and *c'* from the path of pin 75 on sweep lever 59 so that tone arm T is free to travel inwardly for playing a record and outwardly clear of the turntable at the beginning of the next cycle.

This counterclockwise rotation of lever 73 also causes projection 103 on the edge of the plate 27 to contact the lower end of leg L of index member 20 at the beginning of each cycle and return member 20 to upright position if it is not already in upright position. Member 20 may not be in upright position if the weight of the records on the record support is not sufficient to hold member 20 in upright position, as may be the case when only one record remains on the support to be transferred to the turntable.

*Manual operation*

For manual operation spindle top 9 is rotated to be concentric with cam 7 and main spindle 3, and tilt stop 20 together with tone arm descent indexing finger 24 is pushed backward and will be retained in this position due to the engagement of the lower end L of member 20 with spring latch 26a, thus clearing the space over the top of the turntable so that any size record may be easily fed over spindle and down onto the turntable. Since in the "off" position of my change mechanism the tone arm raising and lowering pin 44 is down, movement of tone arm T from or to a position over the top of reject-start button 55 will cause sweep pin 47 carried by pin 44 to depress finger 48b on switch 49 and move the switch to "on" position and start the motor (not shown) for rotation of the turntable.

Thus, simply by moving tone arm from its rest position, by hand toward record playing position, the current for the motor will be supplied and the motor will rotate before the tone arm T can be placed upon the record. Similarly replacing the tone arm manually on start-reject button 55 will tilt switch 49 to "off" position and shut off the motor stopping rotation of the turntable.

When the tilt stop 20 is rotated outwardly on pivot 22, to clear the space over the top of the turntable for manually placing a record on the turntable, the lower end 24a of indexing finger 24 sets the positioning plate for rest position of the tone arm. Stop *c'* on plate 27 is interposed in the path of stop 71 on sweep lever 59 due to shoulder *d* of plate 27 abutting against member 24a. It will therefore be understood that in "manual" operation the automatic mechanism is tripped in the same manner as in automatic operation but the tone arm T can only go back to its rest position, settle on start-reject button 55 and thereby turn off switch 49.

It should be noted that the force exerted by stopping of the tone arm against the selector plate stops is against the selector plate's own pivot 28 while the force necessary to position the selector plate is 90° opposite to said force, with the result that only minimum indexing force is required to secure positive determination of the tone arm descent position.

I claim:

1. In a record changer assembly including a turntable, a support for records above the turntable, means operatively associated with said support and including a rotatable pinion for discharging the records singly from said support onto said turntable, a tone arm adapted to be raised and lowered and to be reciprocated over the turntable, means for actuating said tone arm and said record discharging device in timed relation comprising, a unitary operating lever mounted for reciprocable and rotative movement, a U-shaped rack on said lever, one of the opposed portions of which is elongated and disposed to contact said rotatable pinion during a portion of the travel of said operating lever, a projection on said lever disposed to positively engage with said tone arm during movement of said lever in one direction, and a movable projection on said lever disposed to yieldingly engage with said tone arm during movement of the tone arm in another direction.

2. An automatic record-changer comprising a base-plate, a turntable rotatably supported thereon, a tone arm pivotally supported on said base-plate beyond the periphery of said turntable and moveable in horizontal and vertical planes, a sweep lever connected to said tone arm and adapted to rotate therewith, a spindle for centering and supporting a plurality of records above said turntable comprising a main portion centered with respect to said turntable and a rotatable eccentric portion for providing a shoulder on said spindle for supporting a stack of records, a rotatable means eccentrically disposed within said spindle for moving one record at a time from the supporting means to the turntable, reciprocable means including a U-shaped toothed portion pivotally and slideably supported with respect to said base-plate, pinion means connected to said record-moving means and disposed to be engaged by said U-shaped toothed portion, pinion means engaging said toothed portion of said reciprocable means including a drive wheel pivoted to said base-plate for movement into engagement with a portion of said turntable, a lift pin operatively associated with said tone arm for lifting it above the turntable, an inclined surface on said reciprocable means adjacent said lift pin for operating it when said reciprocable means moves back and forth, and a hook-shaped spring attached to said reciprocable means and movable into position for engaging a portion of said sweep lever and moving it together with the tone arm in a horizontal plane.

3. An automatic record-changer comprising a base-plate, a turntable rotatably supported thereon, a tone arm pivotally supported on said base-plate beyond the periphery of said turntable and moveable in horizontal and vertical planes, a spindle for centering and supporting a plurality of records above said turntable comprising a main portion centered with respect to said turntable and a rotatable eccentric portion for providing a shoulder on said spindle for supporting a stack of records, a rotatable means disposed within said spindle for moving one record at a time from the supporting means to the turntable, a sweep lever connected to said tone arm and adapted to rotate therewith, reciprocable means including a U-shaped toothed portion slideably supported with respect to said base-plate, pinion means connected to said record-moving means and disposed to be engaged by said U-shaped toothed portion, drive means engaging said reciprocable means including a drive wheel pivoted to said base-plate for movement into engagement with a portion of said turntable, a lift pin associated with said tone arm for lifting it above the turntable, a cam on said reciprocable means adjacent said lift pin for operating it when said reciprocable means moves back and forth, and means on said reciprocable means movable into position for engaging a portion of said sweep lever and moving it together with the tone arm in a horizontal plane.

4. An automatic record-changer comprising a base-plate, a turntable rotatably supported thereon, a tone arm pivotally supported on said base-plate beyond the periphery of said turntable and moveable in horizontal and vertical planes, a spindle disposed centrally of said turntable for centering and supporting a plurality of records above said turntable, a rotatable means eccentrically disposed within said spindle for moving one record at a time from the supporting means to the turntable, a sweep lever connected to said tone arm and adapted to rotate therewith, reciprocating means slideably supported with respect to said base-plate, operating means connected to said record-moving means and disposed to be engaged and moved by said reciprocable means, driving means engaging said reciprocable means, a lift pin operatively associated with said tone arm for lifting it above the turntable, an inclined surface on said reciprocable means adjacent said lift pin for operating it when said reciprocable means moves back and forth, and resilient means attached to said reciprocable means and disposed for engaging a portion of said sweep lever and moving it together with the tone arm in a horizontal plane.

5. An automatic record-changer comprising a base-plate, a turntable rotatably supported thereon, a tone arm pivotally supported on said base-plate beyond the periphery of said turntable and movable in horizontal and vertical planes, means adjacent said turntable for supporting a plurality of records above said turntable, rotatable means operatively associated with said supporting means for moving one record at a time from the supporting means to the turntable, a sweep lever connected to said tone arm and adapted to rotate therewith, a trip lever hingedly supported on said base-plate and including a vertically projecting portion in the path of said sweep lever and adapted to be tilted thereby, reciprocating means including a U-shaped toothed portion pivotally and slideably supported with respect to said base-plate adjacent said trip lever to abut a portion of the same whereby when said trip lever is tilted said reciprocable means may revolve about its pivot, pinion means connected to said record-moving means and disposed to be engaged by said U-shaped toothed portion, biasing means attached to said reciprocating means for moving it with respect to said trip lever when the trip lever is tilted by the sweep lever, pinion means engaging said toothed portion of said reciprocable means including a drive wheel pivoted to said base-plate for movement into engagement with a portion of said turntable, biasing means for normally preventing engagement of said drive wheel with the turntable whereby rotation of said reciprocable means moves the drive wheel into engagement with the turntable for reciprocating said reciprocable means, a lift pin operatively associated with said tone arm for lifting it above the turntable, an inclined surface on said reciprocable means adjacent said lift pin for operating it when said reciprocable means moves back and forth, and a hook-shaped spring attached to said reciprocable means and movable into position for engaging a portion of said sweep lever and moving it together with the tone arm in a horizontal plane.

6. An automatic record-changer comprising a base-plate, a turntable rotatably supported thereon, a tone arm pivotally supported on said base-plate beyond the periphery of said turntable and movable in horizontal and vertical planes, means adjacent said turntable for supporting a plurality of records above said turntable, means operatively associated with the supporting means for moving one record at a time from the supporting means to the turntable, a sweep lever connected to said tone arm and adapted to rotate therewith, a trip lever movably supported on said base-plate and including a projecting portion in the path of said sweep lever and adapted to be moved thereby, reciprocable means including a U-shaped toothed portion pivotally and slideably supported adjacent said trip lever to abut a portion of the same whereby when said trip lever is moved said reciprocable means may revolve about its pivot, operating means connected to said record-moving means and disposed to be engaged by said U-shaped toothed portion, biasing means attached to said reciprocating means for moving it with respect to said trip lever when the trip lever is moved by the sweep lever, pinion means engaging said toothed portion of said reciprocable means including a drive wheel pivoted to said base-plate for movement into engagement with a portion of said turntable, biasing means for normally preventing engagement of said drive wheel with the turntable whereby rotation of said reciprocable means moves the drive wheel into engagement with the turntable for reciprocating said reciprocable means, means operatively associated with said tone arm for lifting it above the turntable, a surface on said reciprocable means adjacent said lift means for operating it when said reciprocable means moves back and forth, and a spring attached to said reciprocable means and movable into position for engaging a portion of said sweep lever and moving it together with the tone arm in a horizontal plane.

7. An automatic record-changer comprising a base-plate, a turntable rotatably supported thereon, a tone arm pivotally supported on said base-plate beyond the periphery of said turntable and movable in horizontal and vertical planes, means adjacent said turntable for supporting a plurality of records above said turntable, means operatively associated with said supporting means for moving one record at a time from the supporting means to the turntable, a sweep lever connected to said tone arm and adapted to rotate therewith, a trip lever movably supported on said base-plate and including a projecting portion in the path of said sweep lever and adapted to be moved thereby, reciprocable means including a U-shaped toothed portion pivotally and slideably supported adjacent said trip lever to abut a portion of the same whereby when said trip lever is moved said reciprocable means may revolve about its pivot, operating means connected to said record-moving means and disposed to be engaged by said U-shaped toothed portion, biasing means attached to said reciprocating means for moving it with respect to said trip lever when the trip lever is moved by the sweep lever, pinion means engaging said toothed portion of said reciprocable means including a drive wheel pivoted to said base-plate for movement into engagement with a portion of said turntable, biasing means for normally preventing engagement of said drive wheel with the turntable whereby rotation of said reciprocable means moves the drive wheel into engagement with the turntable for reciprocating said reciprocable means, control means operatively associated with said tone arm for lifting it above the turntable and moving it in a horizontal plane, and means on said reciprocable means adjacent said control means for operating it when said reciprocable means moves back and forth.

8. An automatic record-changer comprising a base-plate, a turntable rotatably supported thereon, a tone arm pivotally supported on said base-plate beyond the periphery of said turntable and movable in horizontal and vertical planes, means adjacent said turntable for supporting a plurality of records above said turntable, means operatively associated with said supporting means for moving one record at a time from the supporting means to the turntable, a sweep lever connected to said tone arm and adapted to rotate therewith, a trip lever in the path of said sweep lever and adapted to be moved thereby, reciprocable means including a U-shaped toothed portion pivotally and slideably supported adjacent said trip lever to abut a portion of the same whereby when said trip lever is moved said reciprocable means may revolve about its pivot, means connected to said record-moving means and disposed to be engaged by said U-shaped toothed portion, means operatively associated with said reciprocating means for moving it with respect to said trip lever when the trip lever is moved by the sweep lever, pinion means engaging said toothed portion of said reciprocable means including a drive wheel supported on said base-plate for movement into engagement with a portion of said turntable whereby rotation of said reciprocable means moves the drive wheel into engagement with the turntable for reciprocating said reciprocable means, control means operatively associated with said tone arm for lifting it above the turntable and moving it in a horizontal plane, and means on said reciprocable means adjacent said control means for operating it when said reciprocable means moves back and forth.

9. An automatic record-changer comprising a base-plate, a turntable rotatably supported thereon, a tone arm pivotally supported on said base-plate beyond the periphery of said turntable and movable in horizontal and vertical planes, a spindle disposed centrally of said turntable for centering and supporting a plurality of records above said turntable, means operatively associated with said spindle for moving one record at a time to said turntable, a sweep lever connected to said tone arm and adapted to rotate therewith, an indexing member pivoted on said base-plate and positioned to engage records supported on said spindle, a pivotally supported stop member including a plurality of stop surfaces movable into the path of said sweep lever for controlling the position of said tone arm with respect to the record on the turntable, stop means normally retained in position by said indexing means for retaining said stop means in a position with a predetermined stop surface located at a point corresponding to records of a predetermined diameter, a projection on said stop means positioned to intercept falling records of a larger diameter than those of said predetermined diameter to change the position of said stop means to allow said stop member to move to position a stop surface in the path of said sweep lever corresponding with the size of record which is dropped to the turntable.

10. An automatic record-changer comprising a base-plate, a turntable rotatably supported thereon, a tone arm pivotally supported on said base-plate beyond the periphery of said turntable and movable in horizontal and vertical planes, a spindle disposed centrally of said turntable for centering and supporting a plurality of records above said turntable, means operatively associated with said spindle for moving one record at a time to said turntable, a sweep lever connected to said tone arm and adapted to rotate therewith, an indexing member positioned to engage records supported on said spindle, a pivotally supported stop member including a stop surface movable into the path of said sweep lever for controlling the position of said tone arm with respect to the record on the turntable, stop means normally retained in position by said indexing means for retaining said stop means in a position with a predetermined stop surface located at a point corresponding to records of a predetermined diameter, a projection on said stop means positioned to intercept falling records of a larger diameter than those of said predetermined diameter to change the position of said stop means to allow said stop member to move to position a stop surface into the path of said sweep lever.

11. An automatic record-changer comprising a base-plate, a turntable rotatably supported thereon, a tone arm pivotally supported on said base-plate beyond the periphery of said turntable and movable in horizontal and vertical planes, means adjacent said turntable for supporting a plurality of records of different sizes above said turntable, means operatively associated with said supporting means for moving one record at a time to said turntable, a sweep lever connected to said tone arm and adapted to rotate therewith, a pivotally supported stop member including a plurality of stop surfaces movable into the path of said sweep lever for controlling the position of said tone arm with respect to the record on the turntable, and stop means positioned to intercept falling records and operatively associated with said stop member for controlling the position of said stop member to move a stop surface into the path of said sweep lever corresponding with the size of record which is dropped to the turntable.

12. In a record changer assembly including a turntable, means connected to said turntable for rotating it, means driven from the hub of said turntable, a rotatable tone arm adjacent said turntable, and a driving member operatively connected to said driven means, means for moving the tone arm inwardly and outwardly over the turntable, comprising, a lever arm disposed to engage with said driving member to be moved thereby, means for mounting said lever arm for reciprocatory movement, said lever arm having means disposed to positively engage with the tone arm to move it outwardly, and having resilient means disposed for engaging the tone arm to move it inwardly, and stop means disposed to be movable into the path of inward movement of the tone arm, said resilient means being movable to disengage from the tone arm when inward movement of the tone arm is prevented by said stop means.

13. In a record changer assembly including a turntable and a tone arm adjacent said turntable adapted to be raised and lowered and to be rotated outwardly and inwardly over the turntable, a spindle projecting upwardly from the turntable to center records thereon, a cam mounted eccentrically to said spindle and rotatable from a position concentric with said spindle to a maximum offset position relative to said spindle and back to a position where it is again concentric with the said spindle, a rotatable shaft coaxial with said eccentric cam and a spindle top member eccentrically mounted on said rotatable shaft movable into register with said cam in its offset position relative to said spindle, and means operatively associated with said cam for rotating it into register with the central hole in a record centered on said offset spindle top and to entrain said record and transfer it to a position in register with the spindle.

14. In a record changer assembly including a turntable, a tone arm adjacent said turntable adapted to be raised and lowered and to be rotated outwardly and inwardly over the turntable, stop means interposable in the path of inward travel of said tone arm to determine its angular position of descent, a support adjacent said tone arm for records to be played, means operatively associated with said support for transferring the records one at a time from said support to the turntable, the combination of unitary operating means disposed for actuating the aforementioned means in timed relation, means operatively associated with said operating means for moving the operating means, and means on said operating means movable into the path of said tone arm for fixedly engaging the tone arm and moving it outwardly and for yieldingly engaging said tone arm and moving it inwardly.

15. An automatic record changer comprising a base plate, a turntable rotatably supported thereon, a tone arm pivotally supported on said base plate beyond the periphery of said turntable and movable in horizontal and vertical planes, means for supporting a plurality of records of different sizes above said turntable, means operatively associated with said supporting means for moving one record at a time from the supporting means to the turntable, a sweep lever connected to said tone arm and adapted to rotate therewith, a tone arm stop member pivotally connected to said base plate and including stops thereon spaced with respect to one another for positioning the tone arm over the initial playing groove of a small record or a large record or beyond the periphery of a record on said turntable, control means for positioning said stop member to selectively place one of said stops in the path of said sweep lever, said control means comprising a pivoted out-of-balance member disposed to be contacted by records on said support and having an arm extending into the plane of said stop member, and disposed to be moved by large records when they move to the turntable and by said out-of-balance member, spaced surfaces on said stop member disposed to engage said arm depending upon its position, biasing means operatively associated with said stop member for positioning said stop member in accordance with the surface which is engaged by said arm, a movable unitary operating member operatively associated with said tone arm and said record moving means for controlling them in timed relation, and means disposed on said unitary operating member for disengaging said stop member from contact with said out-of-balance member during each change cycle of said record changer.

16. An automatic record changer comprising a base plate, a turntable rotatably supported thereon, a tone arm pivotally supported on said base plate beyond the periphery of said turntable and movable in horizontal and vertical planes, means for supporting a plurality of records of different sizes above said turntable, means operatively associated with said supporting means for moving one record at a time from the supporting means to the turntable, a sweep lever connected to said tone arm and adapted to rotate therewith, a tone arm stop member operatively associated with said sweep lever and including stops thereon spaced with respect to one another for positioning the tone arm over the initial playing groove of a small record or a large record or into a position beyond the periphery of a record on said turntable, control means for moving said stop member to selectively place one of said stops in the path of said sweep lever, said control means comprising a pivoted out-of-balance member disposed to contact a record on said support or a large record moving to said turntable and extending into the plane of said stop member, surfaces on said stop member disposed to engage said out-of-balance member depending upon its position, and biasing means for moving said stop member to engage one of said surfaces with said out-of-balance member and thereby position a stop in the path of said sweep lever.

TOWNSEND S. JONES.

REFERENCES CITED

The following references are of record in the file of this patent:

UNITED STATES PATENTS

| Number | Name | Date |
|---|---|---|
| 1,538,667 | Smith | May 19, 1925 |
| 1,879,291 | Johnson et al. | Sept. 27, 1932 |
| 1,883,942 | Kincannon | Oct. 25, 1932 |
| 1,926,580 | Clark | Sept. 12, 1933 |
| 2,017,898 | Gates | Oct. 22, 1935 |
| 2,031,449 | Arvidius | Feb. 18, 1936 |
| 2,145,743 | Welch | Jan. 31, 1939 |
| 2,158,328 | Johnson | May 16, 1939 |
| 2,207,706 | Andrews | July 16, 1940 |
| 2,220,435 | Wright | Nov. 5, 1940 |
| 2,235,693 | Wells | Mar. 18, 1941 |
| 2,251,381 | Wright | Aug. 5, 1941 |
| 2,270,415 | Catucci | Jan. 20, 1942 |
| 2,270,995 | Compare | Jan. 27, 1942 |
| 2,286,490 | Knox | June 16, 1942 |
| 2,287,098 | Habegger | June 23, 1942 |
| 2,289,355 | Green | July 14, 1942 |
| 2,290,518 | Wright | July 21, 1942 |
| 2,291,158 | Holstensson et al. | July 28, 1942 |
| 2,293,703 | Becwar | Aug. 25, 1942 |
| 2,297,014 | Offen | Sept. 29, 1942 |
| 2,309,352 | Offen | Jan. 26, 1943 |
| 2,328,052 | Butler | Aug. 31, 1943 |
| 2,331,383 | Faulkner | Oct. 12, 1943 |
| 2,333,414 | De Tar | Nov. 2, 1943 |
| 2,396,094 | Gay | Mar. 5, 1946 |

FOREIGN PATENTS

| Number | Country | Date |
|---|---|---|
| 822,026 | France | Sept. 6, 1937 |